(12) United States Patent
Stein et al.

(10) Patent No.: US 11,192,557 B2
(45) Date of Patent: *Dec. 7, 2021

(54) ROAD PROFILE ALONG A PREDICTED PATH

(71) Applicant: MOBILEYE VISION TECHNOLOGIES LTD., Jerusalem (IL)

(72) Inventors: Gideon Stein, Jerusalem (IL); Itay Blumenthal, Jerusalem (IL); Nadav Shaag, Jerusalem (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 143 days.

This patent is subject to a terminal disclaimer.

(21) Appl. No.: 16/667,884

(22) Filed: Oct. 29, 2019

(65) Prior Publication Data
US 2020/0062264 A1 Feb. 27, 2020

Related U.S. Application Data

(63) Continuation of application No. 15/891,365, filed on Feb. 7, 2018, now Pat. No. 10,513,269, which is a
(Continued)

(51) Int. Cl.
*B60W 40/06* (2012.01)
*B60W 50/00* (2006.01)
(Continued)

(52) U.S. Cl.
CPC ......... *B60W 40/06* (2013.01); *B60G 17/0182* (2013.01); *B60T 8/172* (2013.01);
(Continued)

(58) Field of Classification Search
CPC ............ B60W 50/0097; B62D 15/021; B62D 15/0295; G60G 17/0182; G05D 1/0251; G06K 9/46; G06T 3/40; B60T 8/172
(Continued)

(56) References Cited

U.S. PATENT DOCUMENTS 7,729,830 B2  6/2010 Tarasinski et al.
8,321,088 B2  11/2012 Brown et al.
(Continued)

FOREIGN PATENT DOCUMENTS

DE  102013101639 A1  9/2014
EP  2 602 741 A1  6/2013
EP  2 757 527 A1  7/2014

OTHER PUBLICATIONS

English Translation of DE102013101639, Accessed via Espacenet Feb. 14, 2017.
(Continued)

*Primary Examiner* — Krishnan Ramesh
(74) *Attorney, Agent, or Firm* — Finnegan, Henderson, Farabow, Garrett & Dunner, LLP

(57) ABSTRACT

Systems and methods are provided for determining a road profile along a predicted path. In one implementation, a system includes at least one image capture device configured to acquire a plurality of images of an area in a vicinity of a user vehicle; a data interface; and at least one processing device configured to receive the plurality of images captured by the image capture device through the data interface; and compute a profile of a road along one or more predicted paths of the user vehicle. At least one of the one or more predicted paths is predicted based on image data.

20 Claims, 16 Drawing Sheets

Related U.S. Application Data continuation of application No. 15/151,135, filed on May 10, 2016, now Pat. No. 9,902,401.

(60) Provisional application No. 62/159,298, filed on May 10, 2015, provisional application No. 62/189,338, filed on Jul. 7, 2015.

(51) Int. Cl.

| | | |
|---|---|---|
| *B62D 15/02* | (2006.01) | |
| *B60G 17/018* | (2006.01) | |
| *G05D 1/02* | (2020.01) | |
| *G06K 9/46* | (2006.01) | |
| *G06T 3/40* | (2006.01) | |
| *B60T 8/172* | (2006.01) | |
| *G06T 7/55* | (2017.01) | |
| *G06K 9/00* | (2006.01) | |

(52) U.S. Cl.
CPC ....... *B60W 50/0097* (2013.01); *B62D 15/021* (2013.01); *B62D 15/0295* (2013.01); *G05D 1/0251* (2013.01); *G06K 9/00798* (2013.01); *G06K 9/46* (2013.01); *G06T 3/40* (2013.01); *G06T 7/55* (2017.01); *B60T 2201/08* (2013.01); *B60T 2201/083* (2013.01); *B60T 2210/32* (2013.01); *G06T 2207/10021* (2013.01); *G06T 2207/20084* (2013.01); *G06T 2207/30241* (2013.01); *G06T 2207/30256* (2013.01)

(58) Field of Classification Search
USPC ......................................................... 701/41
See application file for complete search history.

(56) References Cited

U.S. PATENT DOCUMENTS

| | | | |
|---|---|---|---|
| 9,118,816 B2 | 8/2015 | Stein et al. | |
| 9,205,835 B2 | 12/2015 | Stein et al. | |
| 9,233,688 B2 | 1/2016 | Clarke et al. | |
| 9,421,973 B2 | 8/2016 | Lee | |
| 9,643,616 B2* | 5/2017 | Lu | B60T 8/17551 |
| 9,751,529 B2* | 9/2017 | Zhang | B60W 40/06 |
| 2008/0082246 A1* | 4/2008 | Brown | B60W 30/045 |
| | | | 701/91 |
| 2009/0143941 A1* | 6/2009 | Tarasinski | A01D 41/127 |
| | | | 701/41 |
| 2009/0195414 A1 | 8/2009 | Riegel et al. | |
| 2010/0224431 A1 | 5/2010 | Switkes et al. | |
| 2012/0316730 A1* | 12/2012 | Zhang | B60W 40/06 |
| | | | 701/41 |
| 2013/0141580 A1* | 6/2013 | Stein | G06K 9/00805 |
| | | | 348/148 |
| 2014/0156126 A1* | 6/2014 | Tran | G01F 23/242 |
| | | | 701/22 |
| 2014/0160244 A1 | 6/2014 | Berberian et al. | |
| 2014/0358424 A1 | 12/2014 | Lavole et al. | |
| 2014/0371988 A1 | 12/2014 | Muramatsu | |
| 2015/0166072 A1* | 6/2015 | Powers | G08G 1/0129 |
| | | | 701/1 |
| 2015/0248132 A1* | 9/2015 | Lee | B60W 30/10 |
| | | | 701/23 |
| 2015/0353095 A1* | 12/2015 | Freess | B60C 9/00 |
| | | | 701/41 |
| 2015/0371095 A1* | 12/2015 | Hartmann | G06K 9/00791 |
| | | | 348/148 |
| 2016/0046170 A1* | 2/2016 | Lu | B60T 8/17551 |
| | | | 701/48 |
| 2016/0046290 A1 | 2/2016 | Aharony et al. | |
| 2016/0121902 A1* | 5/2016 | Huntzicker | B60W 40/068 |
| | | | 701/41 |

OTHER PUBLICATIONS

International Search Report and Written Opinion dated Jul. 13, 2016 in corresponding application No. PCT/US2016/031631, 12 pages.
U.S. Appl. No. 62/270,431, filed Dec. 21, 2015, entitled "Fusion of REM with Other Lane Cues for Lateral Control."
PCT International Application No. PCT/US16/17411, filed Feb. 10, 2016, entitled "Sparse Map for Autonomous Vehicle Navigation".
U.S. Appl. No. 62/181,784, filed Jun. 19, 2015, entitled "HPP Holistic Path Prediction."

\* cited by examiner

ROAD PROFILE ALONG A PREDICTED PATH

CROSS REFERENCES TO RELATED APPLICATIONS

This application is a continuation of U.S. application Ser. No. 15/891,365, Feb. 7, 2018, which is a continuation of U.S. application Ser. No. 15/151,135, filed May 10, 2016 (now U.S. Pat. No. 9,902,401), which claims the benefit of priority of U.S. Provisional Patent Application No. 62/159,298, filed on May 10, 2015, and U.S. Provisional Patent Application No. 62/189,338, filed on Jul. 7, 2015. The disclosures of the foregoing applications are incorporated herein by reference in their entireties.

BACKGROUND

Active or adaptive suspension systems for vehicles can be useful for improving the ride quality of the vehicles and the comfort of passengers. Typically, active and adaptive suspension systems actively control the operation of one or more elements of the vehicle's suspension system and thus change its behavior. For example, some active suspension system change the vertical movement of the wheels relative to the chassis of the vehicle body, or change the shock absorber stiffness. Reactive suspension simply reacts to the road surface or to obstacles on the road without changing the behavior of the suspension system or its components.

SUMMARY

Embodiments consistent with the present disclosure provide systems and methods for determining a road profile along a predicted path.

Consistent with a disclosed embodiment, a system includes at least one image capture device configured to acquire a plurality of images of an area in a vicinity of a user vehicle; a data interface; and at least one processing device configured to receive the plurality of images captured by the image capture device through the data interface; and compute a profile of a road along one or more predicted paths of the user vehicle. At least one of the one or more predicted paths is predicted based on image data.

Consistent with another disclosed embodiment, a method of estimating a road profile includes acquiring a plurality of images of an area in a vicinity of a user vehicle; and obtaining one or more predicted paths for the user vehicle. At least one of the one or more predicted paths is predicted based on the plurality of images. The method further includes computing a profile of a road along one or more predicted paths of the user vehicle.

Consistent with other disclosed embodiments, non-transitory computer readable storage media may store program instructions, which are executed by at least one processing device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings.

DESCRIPTION

Figure 1:
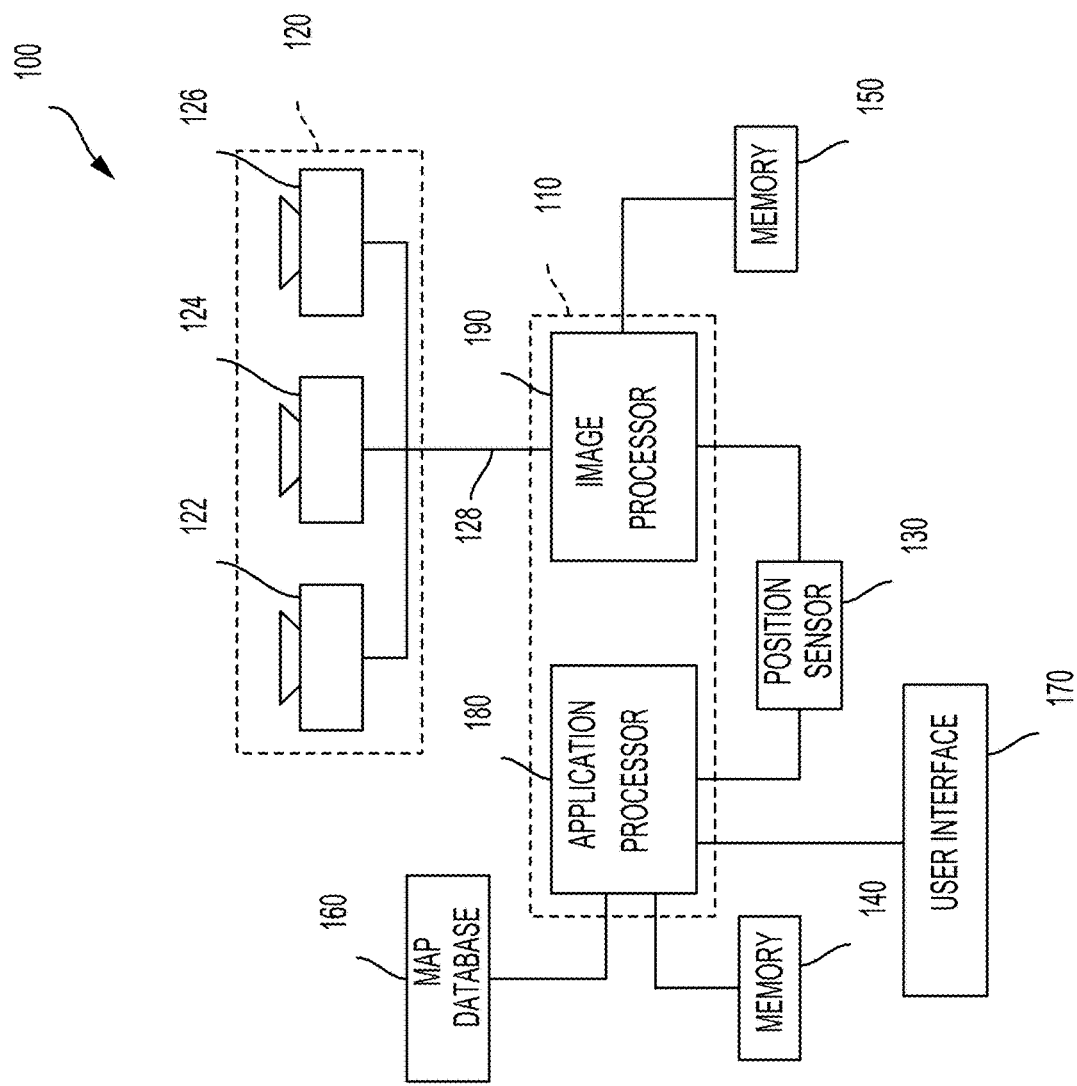
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with active suspension, adaptive suspension, autonomous navigation/driving and/or driver assist technology features. Driver assist technology refers to any suitable technology to assist drivers in the navigation and/or control of their vehicles, such as FCW, LDW and TSR, as opposed to fully autonomous driving. Active and adaptive suspension technology relates to any suitable technology to actively control the operation of one or more elements of the vehicle's suspension system and thus change its behavior. In various embodiments, the system may include one, two, or more cameras mountable in a vehicle and an associated processor that monitor the environment of the vehicle. In further embodiments, additional types of sensors can be mounted in the vehicle and can be used in the active/adaptive suspension and/or autonomous navigation and/or driver assist system. In some examples of the presently disclosed subject matter, the system may provide techniques for processing images of an environment ahead of a vehicle to compute a profile of a road along one or more predicted paths of the user vehicle.

In accordance with an aspect of the present disclosure, there is provided a system comprising at least one image capture device, a data interface and at least one processing device, configured to receive images captured by the image capture device through the data interface. The at least one image capture device configured to acquire a plurality of images of an area in a vicinity of a user vehicle. The at least one processing device is configured to compute a profile of a road along one or more predicted paths of the user vehicle, where at least one of the one or more predicted paths is predicted based on image data. Optionally, the profile of the road along each one of the one or more predicted paths of the user vehicle can be computed along the estimated wheel tracks of the user vehicle along the respective predicted path. Still further by way of example, the profile of the road along each one of the one or more predicted paths of the user vehicle can be limited to approximately the width of the track of each wheel or wheel-pair (or group of wheels for trucks and other such multi-wheeled vehicles) of the vehicle along the respective predicted path.

In accordance with a further aspect of the presently disclosed embodiments, there is provided a method of computing a road profile. In one embodiment, the method can include: capturing a plurality of images of an area in a vicinity of a user vehicle; obtaining one or more predicted paths of the user vehicle; and computing a profile of a road along one or more predicted paths of the user vehicle, where at least one of the one or more predicted paths is predicted based on image data.

FIG. 1, to which reference is now made, is a block diagram representation of a system according to examples of the disclosed embodiments. System 100 can include various components depending on the requirements of a particular implementation. In some examples, system 100 can include a processing unit 110, an image acquisition unit 120 and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition devices and components depending on the requirements of a particular application. In some embodiments, image acquisition unit 120 can include one or more image capture devices (e.g., cameras), such as image capture device 122, image capture device 124, and image capture device 126. Optionally, system 100 can also include a data interface 128 communicatively connecting processing unit 110 to image acquisition device 120. For example, data interface 128 can include any wired and/or wireless link or links for transmitting image data acquired by image acquisition device 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

Optionally, application processor 180 and/or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, can be used in the disclosed examples. In yet another example, the EyeQ4®, the fourth generation processor, can be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing and processing the imagery from the image sensors. The CPU can include any number of microcontrollers or microprocessors. The support circuits can be any number of circuits generally well known in the art, including cache, power supply, clock and input-output circuits. The memory can store software that, when executed by the processor, controls the operation of the system. The memory can include databases and image processing software. The memory can include any number of random access memories, read only memories, flash memories, disk drives, optical storage, removable storage and other types of storage. In one instance, the memory can be separate from the processing unit 110. In another instance, the memory can be integrated into the processing unit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage and/or any other types of storage. In some examples, memory units 140, 150 can be separate from the application processor 180 and/or image processor 190. In other embodiments, these memory units can be integrated into application processor 180 and/or image processor 190.

Optionally, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

Optionally, the system 100 can be operatively connectable to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, a suspension system and a steering system.

Optionally, the system 100 can include a user interface 170. User interface 170 can include any device suitable for providing information to or for receiving inputs from one or more users of system 100. In some embodiments, user interface 170 can include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100. Information can be provided by the system 100, through the user interface 170, to the user in a similar manner.

Optionally, the system 100 can include a map database 160. The map database 160 can include any type of database for storing digital map data. In some examples, map database 160 can include data relating to a position, in a reference coordinate system, of various items, including roads, lanes and layout of lanes, objects on the road, water features, geographic features, points of interest, etc. Map database 160 can store not only the locations of such items, but also descriptors relating to those items, including, for example, names associated with any of the stored features. In some embodiments, map database 160 can be physically located with other components of system 100. Alternatively or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensors, a RF sensor (e.g., radar transceiver), a LIDAR sensor. Such sensors can be used independently of or in cooperation with the image acquisition device 120. For example, the data from the radar system (not shown) can be used for validating the processed information that is received from processing images acquired by the image acquisition device 120, e.g., to filter certain false positives resulting from processing images acquired by the image acquisition device 120 or for augmenting, completing or otherwise improving images acquired by the image acquisition device 120.

Figure 2A:
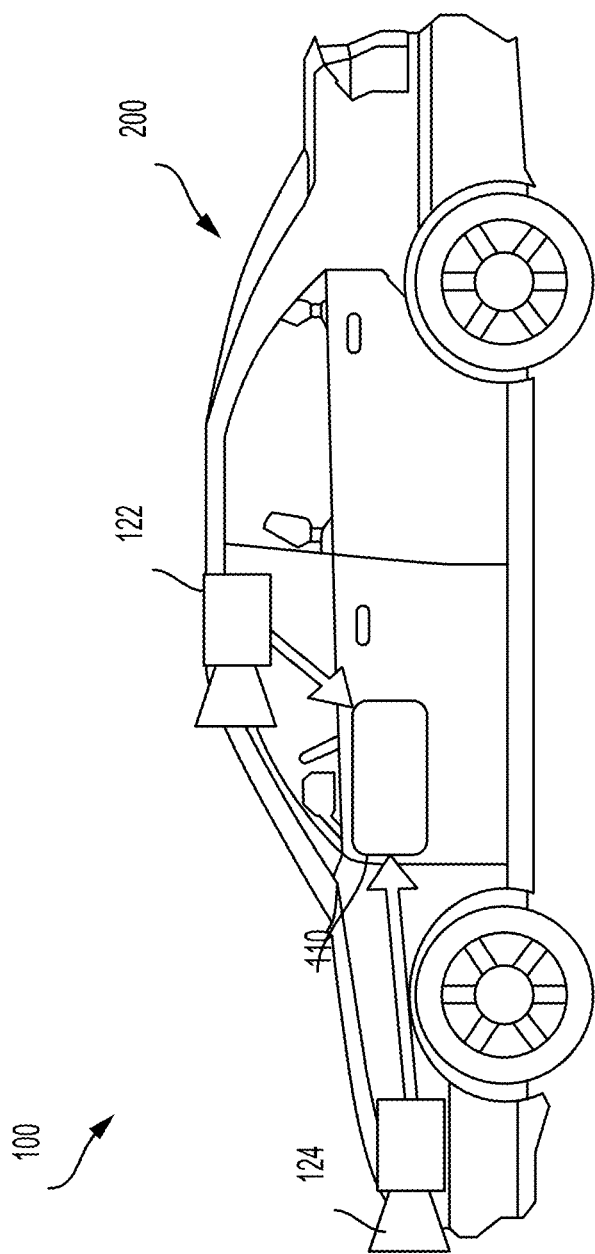
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single-image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3A-3C, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a FOV that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver, optionally, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
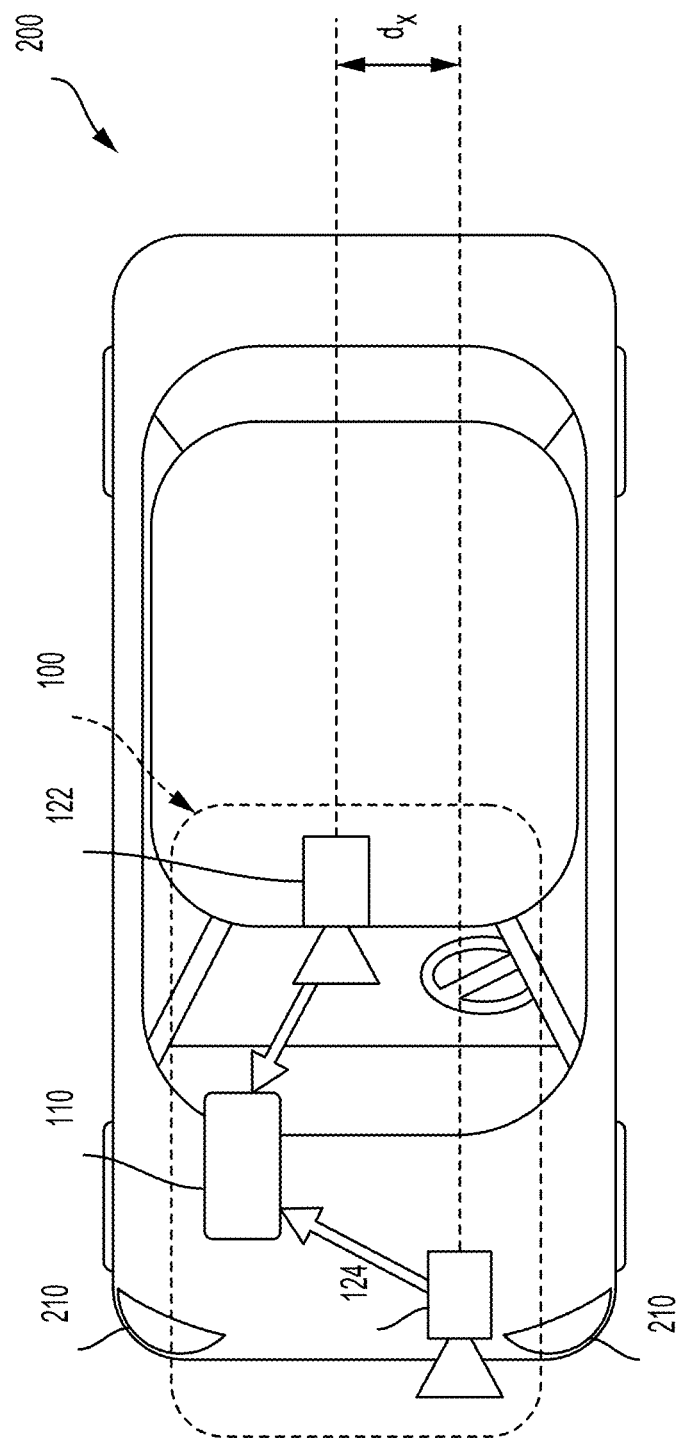
FIG. 2B is a diagrammatic top view representation of the vehicle and system shown in FIG. 2A consistent with the disclosed embodiments.

FIG. 2A is a diagrammatic side view representation of a vehicle imaging system according to examples of the disclosed embodiments. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
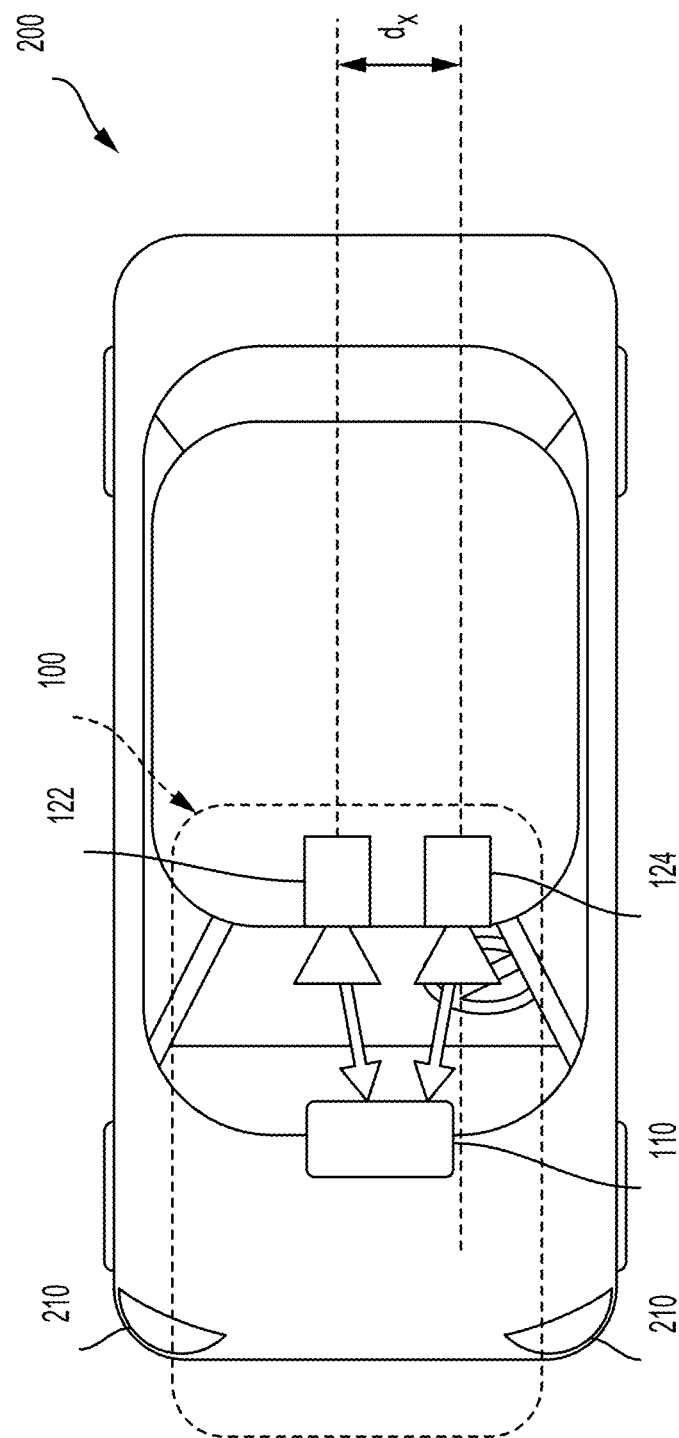
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
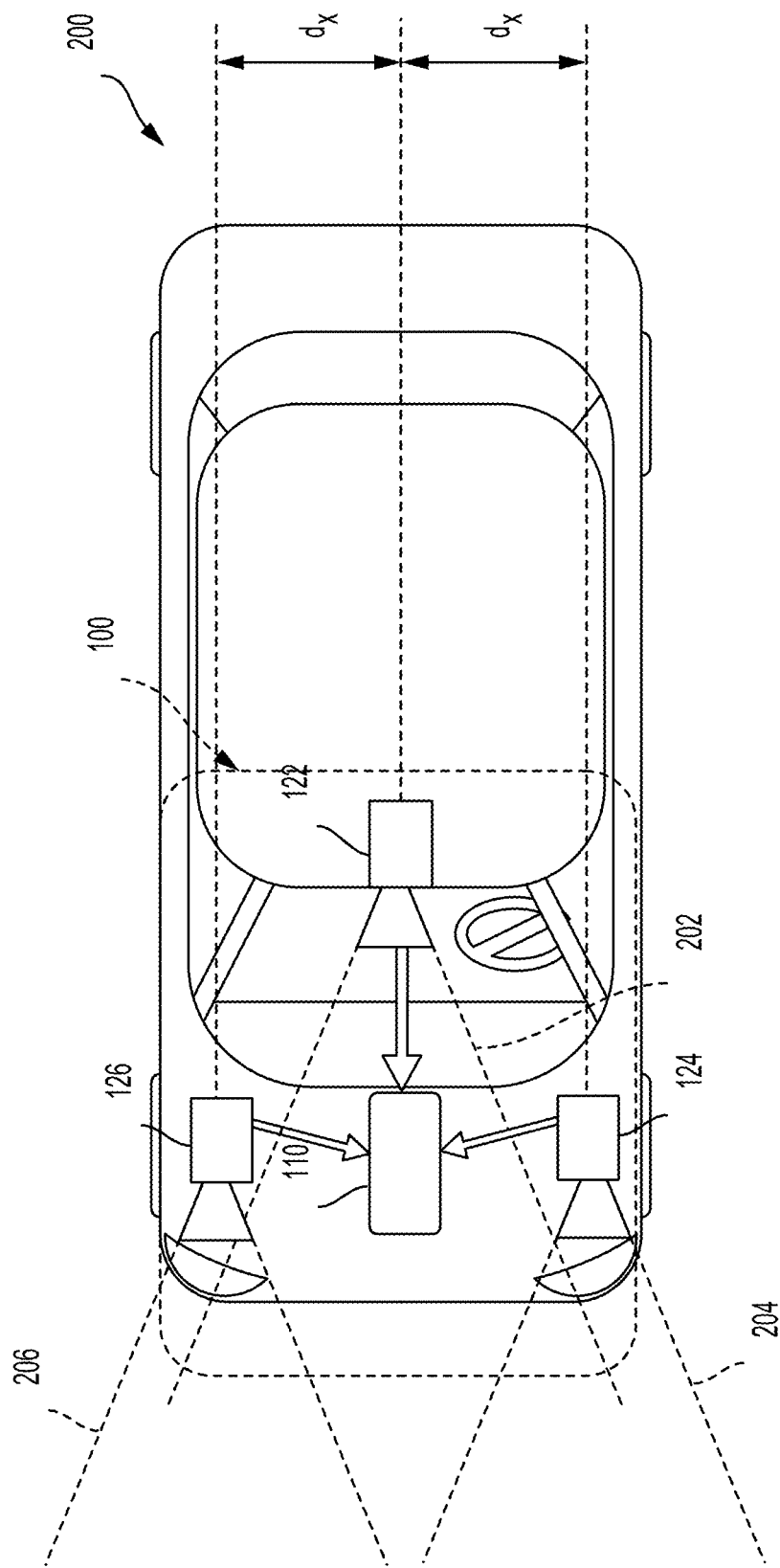
FIG. 2D is a diagrammatic top view representation of yet another embodiment of a vehicle including a system consistent with the disclosed embodiments.
Figure 2E:
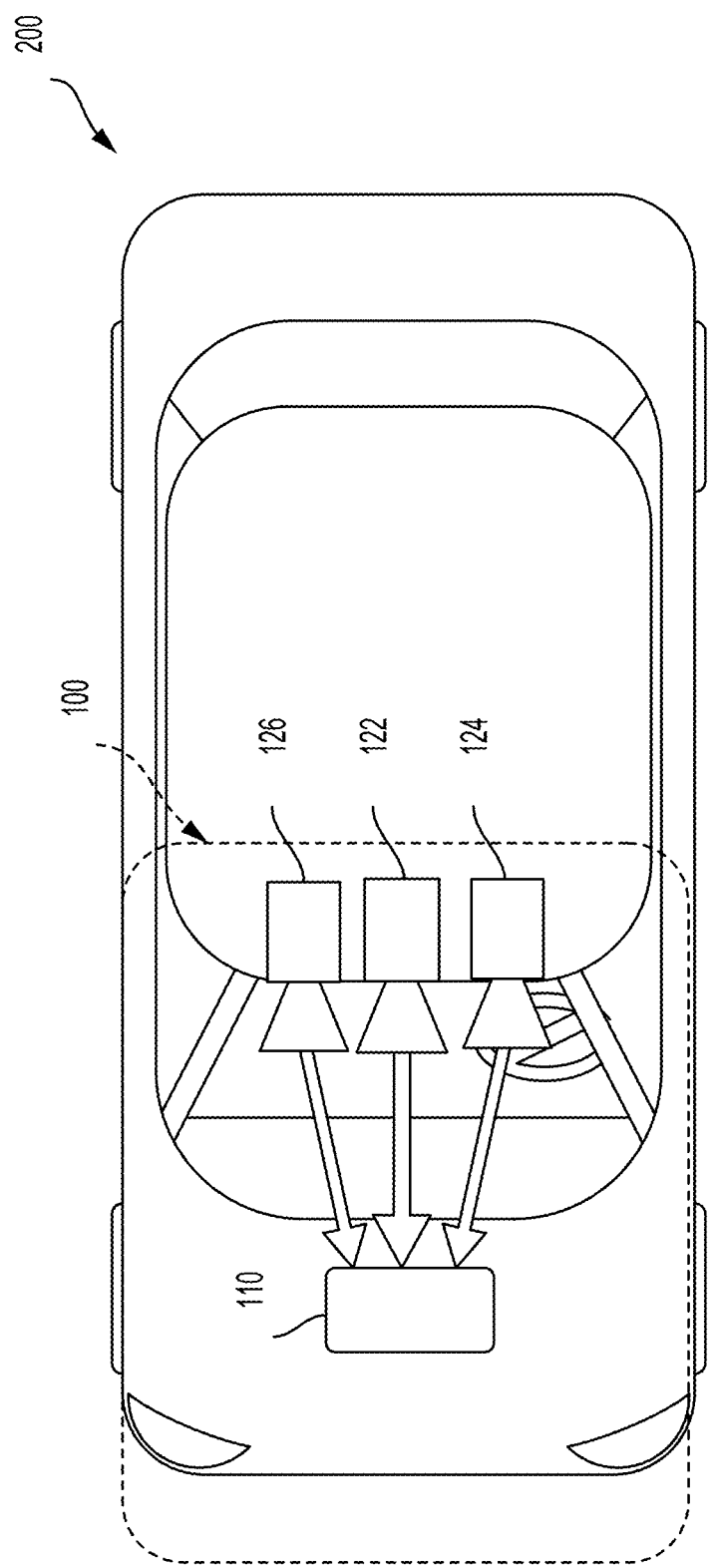
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired field-of-view (FOV) 202, as illustrated in FIG. 2D.

The first image capture device 122 may have a scan rate associated with acquisition of each of the first series of image scan lines. The scan rate may refer to a rate at which an image sensor can acquire image data associated with each pixel included in a particular scan line.

Figure 2F:
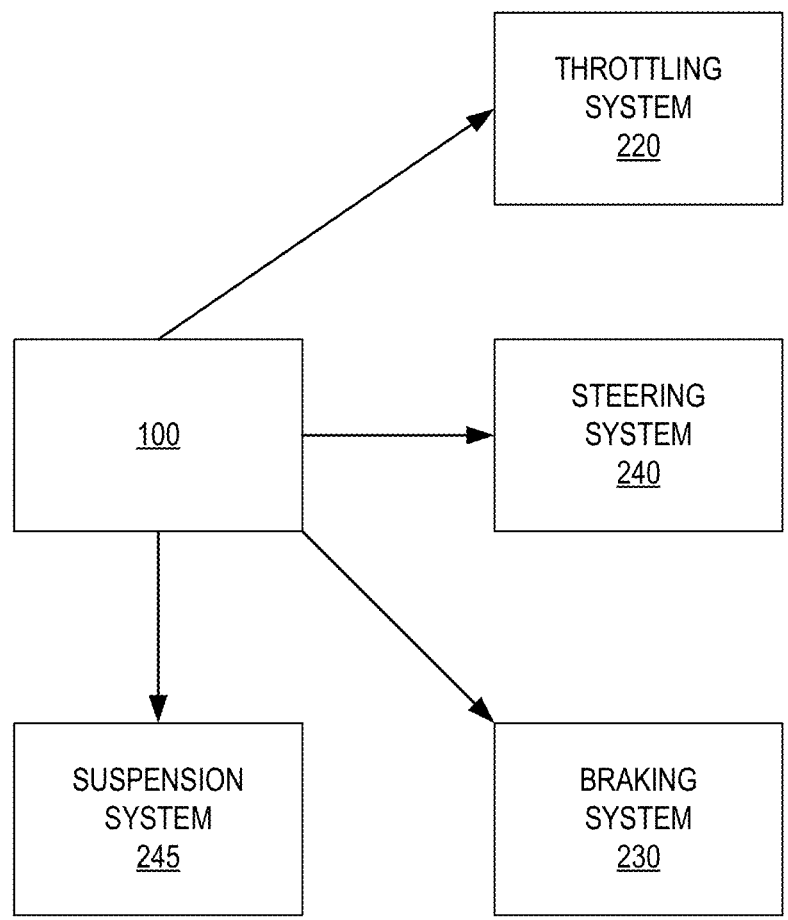
FIG. 2F is a diagrammatic representation of exemplary vehicle control systems consistent with the disclosed embodiments.

FIG. 2F is a diagrammatic representation of vehicle control systems, according to examples of the presently disclosed subject matter. As indicated in FIG. 2F, vehicle 200 can include throttling system 220, braking system 230, and steering system 240. System 100 can provide inputs (e.g., control signals) to one or more of throttling system 220, braking system 230, suspension system 245, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3A:
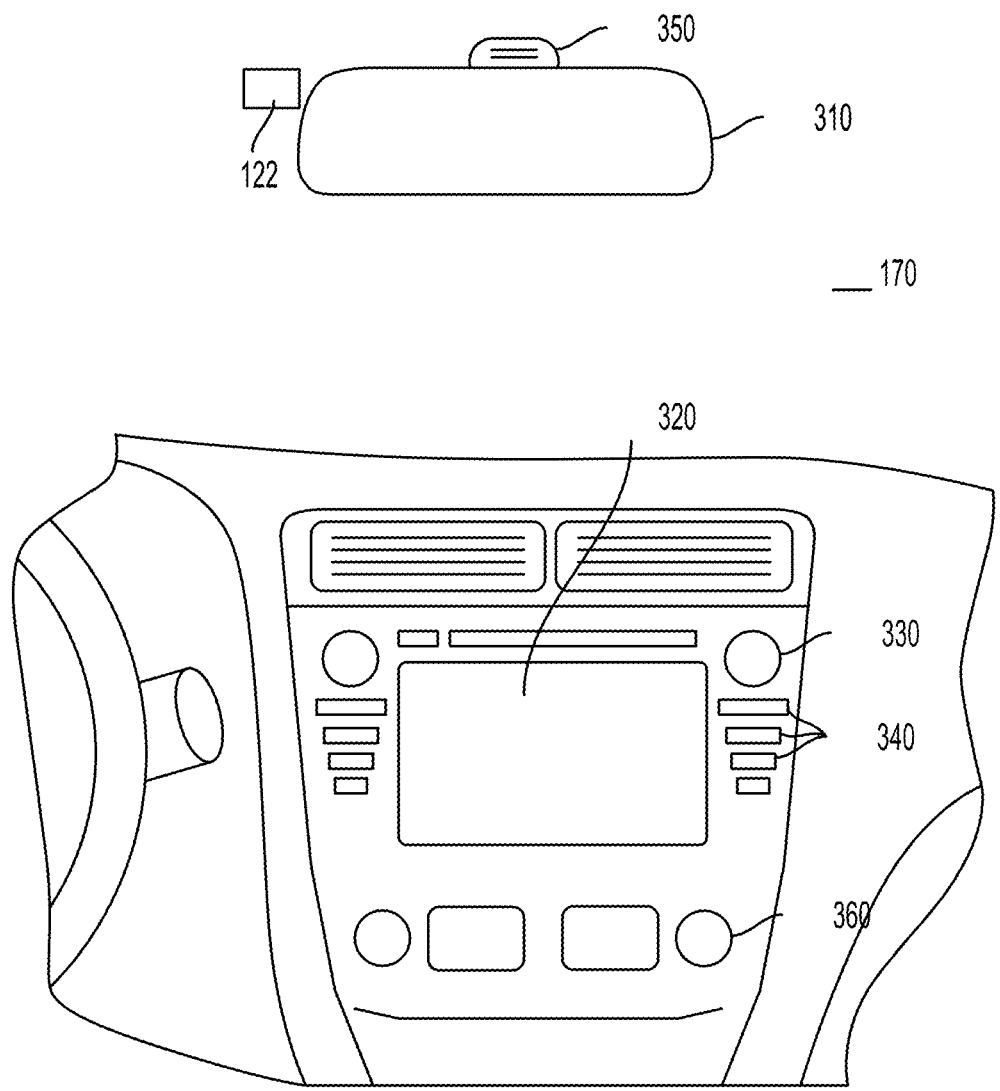
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
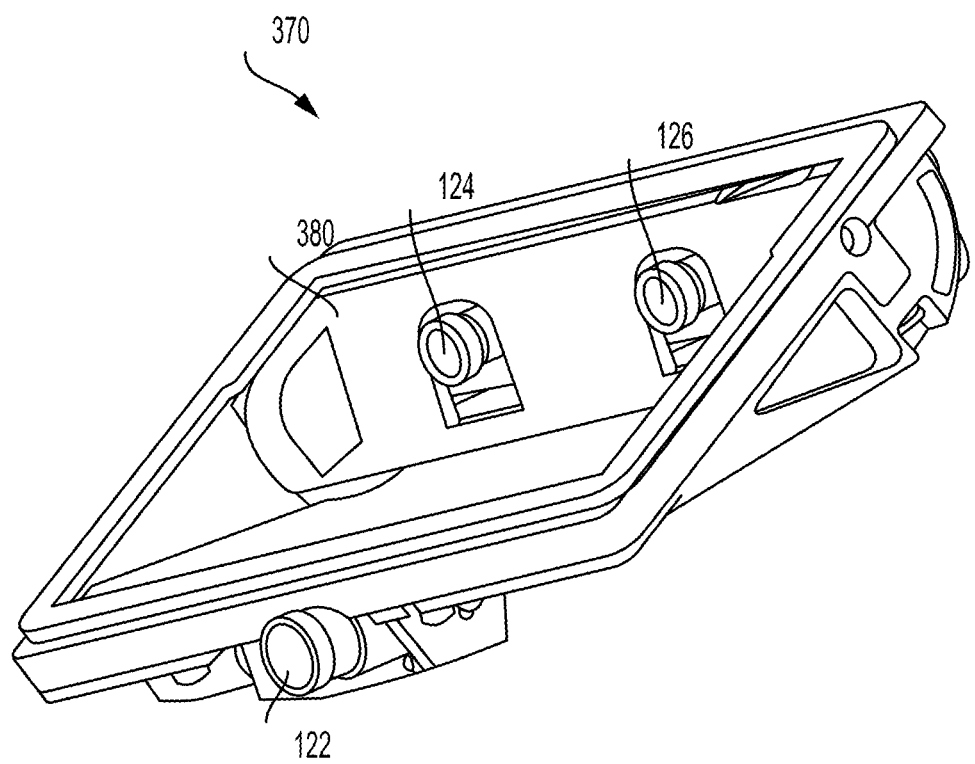
FIG. 3B is an illustration of an example of a camera mount that is configured to be positioned behind a rearview mirror and against a vehicle windshield consistent with the disclosed embodiments.
Figure 3C:
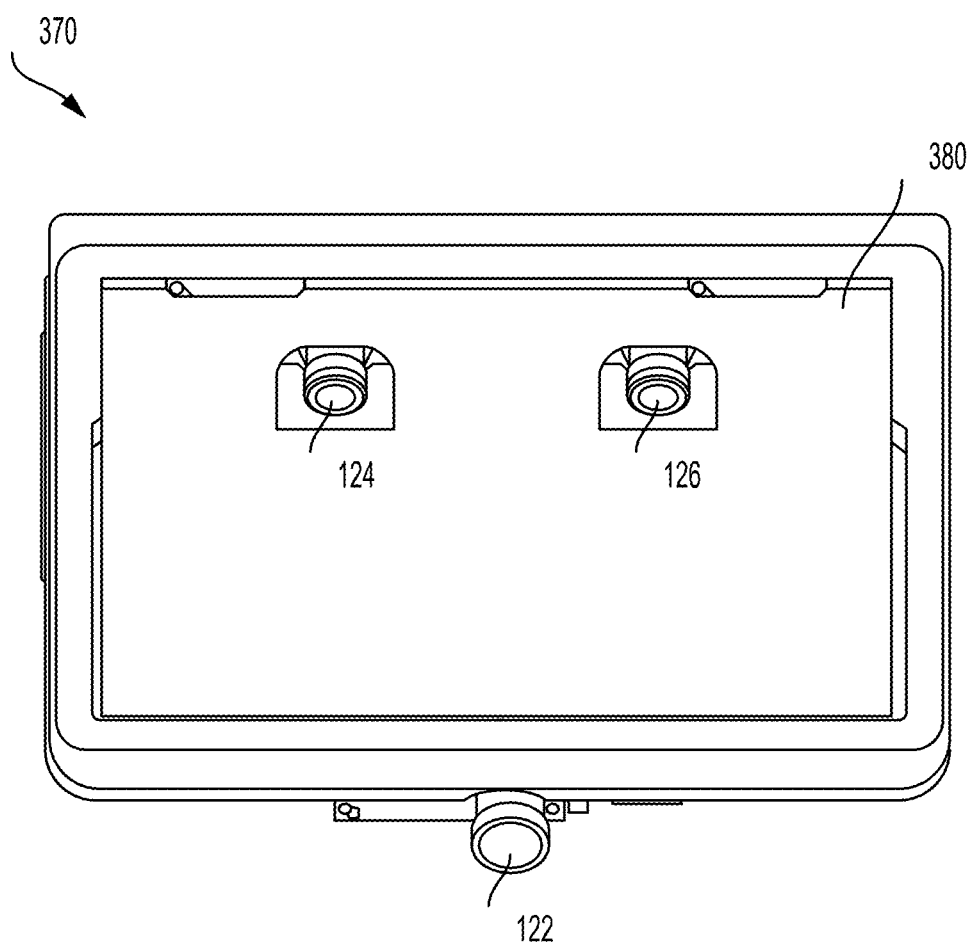
FIG. 3C is an illustration of the camera mount shown in FIG. 3B from a different perspective consistent with the disclosed embodiments.
Figure 3D:
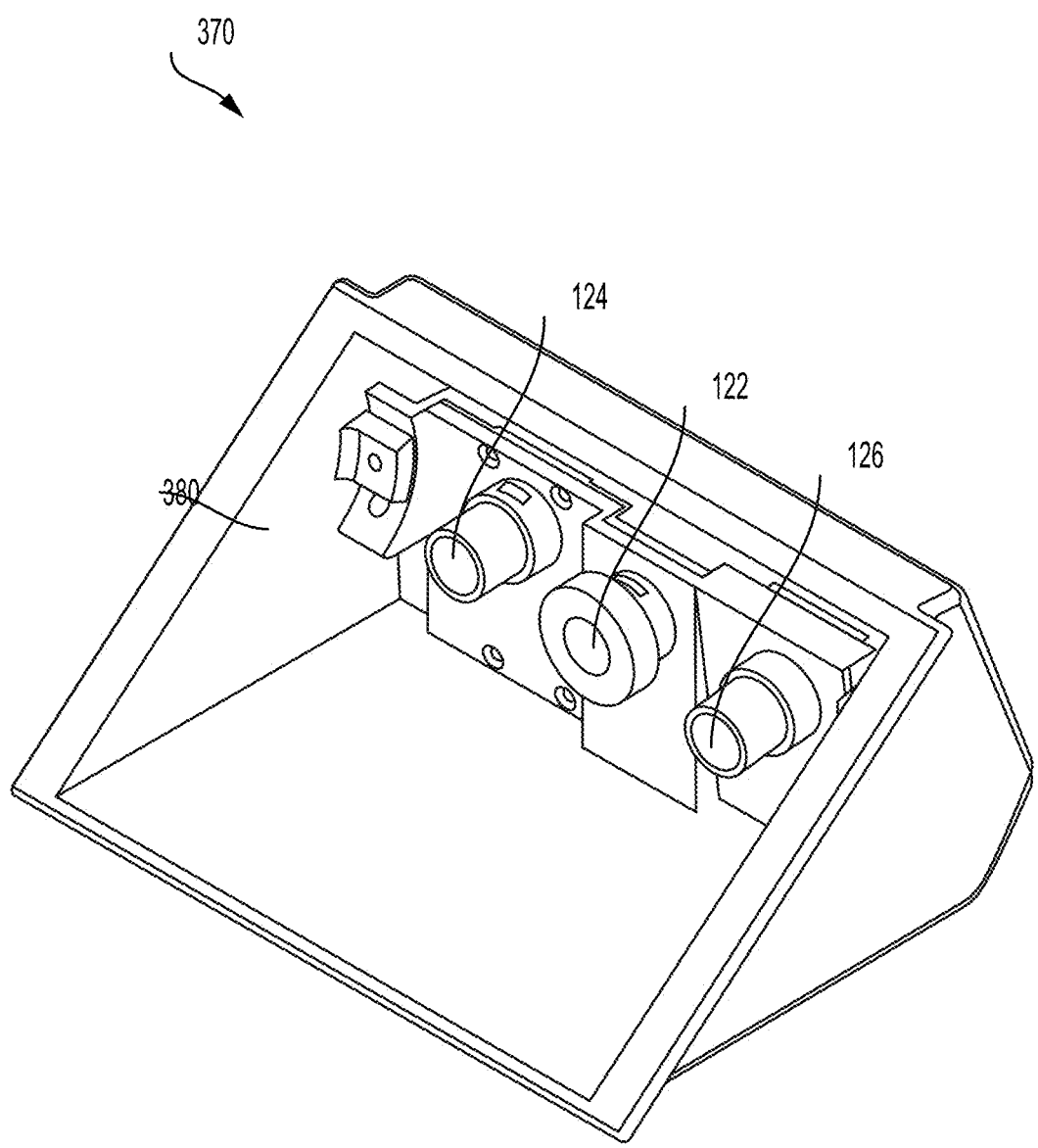
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments are not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Multi-Imaging System

As discussed above, system 100 may use a single or a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform processing of the narrow FOV camera or even a cropped FOV of the camera, such as a region of interest (ROI) within the field of view of the camera. In addition, one the same or different images, several processing operations can be performed, including on different parts or portions of the images, and optionally some processing operation can be applied to the full image whereas other processing operation can use only a portion of the (same) image. For example, the first processing device can be configured to and used for computing a profile of a road along one or more predicted paths of the user vehicle. In yet another example, the first processing device can be configured to and used for determining a predicted path of the vehicle, using image data obtained from an image capture device onboard the vehicle. Still further by way of example, the first processing device can be configured to use a trained neural network to estimate a predicted path ahead of a current location of the vehicle, in accordance with examples of the presently disclosed subject matter.

The first processing device can be further adapted to preform image processing tasks, for example, which can be intended to detect obstacles on the road, other vehicles, pedestrians, lane marks, traffic signs, traffic lights, and other road objects. The processing The first processing device can be further adapted to preform image processing tasks which can be intended to estimate a profile of a road along a path of the vehicle. The path can be an estimated path of the vehicle. By way of example, the first processing device can be adapted to obtain the information mentioned above, or detect the objects listed above, as well as other objects, exclusively or non-exclusively based on monocular image processing. As mentioned in this disclosure, while it is possible that monocular imaging will be used in embodiments of the present invention, it is also possible that stereo imaging would be used and also that other types of sensors, including, for example, radar, LIDAR and kinematic sensors, for example, would be used.

Still further, the first processing device may calculate a disparity of pixels between the images from the main camera and the narrow camera (or any other pair of stereo setup) and create a 3D reconstruction of the environment of vehicle 200. The first processing device may then combine the 3D reconstruction with 3D map data (e.g., a depth map) or with 3D information calculated based on information from another camera. Optionally, the first processing device can be configured to use the trained neural network on depth information (for example the 3D map data) to estimate a future path ahead of a current location of a vehicle, in accordance with examples of the presently disclosed subject matter. In this implementation the neural network can be trained on depth information, such as 3D map data.

The second processing device may receive images from main camera and can be configured to perform vision processing to detect obstacles on the road, other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images or with the depth information obtained by stereo processing.

The third processing device may receive images from the wide FOV camera and process the images to detect obstacles on the road, vehicles, pedestrians, lane marks, traffic signs, traffic lights, and other road objects. The third processing device may execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing suspension control assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124.

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

As will be appreciated by a person skilled in the art having the benefit of this disclosure, numerous variations and/or modifications can be made to the foregoing disclosed examples. For example, not all components are essential for the operation of system 100. Further, any component can be located in any appropriate part of system 100 and the components can be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and control vehicle 200 or systems thereof or alert a user of the vehicle in response to the analysis.

As discussed below in further detail and according to examples of the presently disclosed subject matter, system 100 may provide a variety of features related to suspension control autonomous driving, semi-autonomous driving, and/or driver assist technology. For example, system 100 can analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 can analyze the collected data to determine whether or not vehicle 200 should take a certain action, and then automatically take the determined action without human intervention or it can provide a warning, alert or instruction which can indicate to a driver that a certain action needs to be taken. Automatic actions can be carried out under human supervision and can be subject to human intervention and/or override. For example, when vehicle 200 navigates without human intervention, system 100 may automatically control the suspension, braking, acceleration, and/or steering of vehicle 200 (e.g., by sending control signals to one or more of throttling system 220, braking system 230, suspension system 245 and steering system 240). Further, system 100 can analyze the collected data and issue warnings and/or alerts to vehicle occupants based on the analysis of the collected data.

Figure 4:
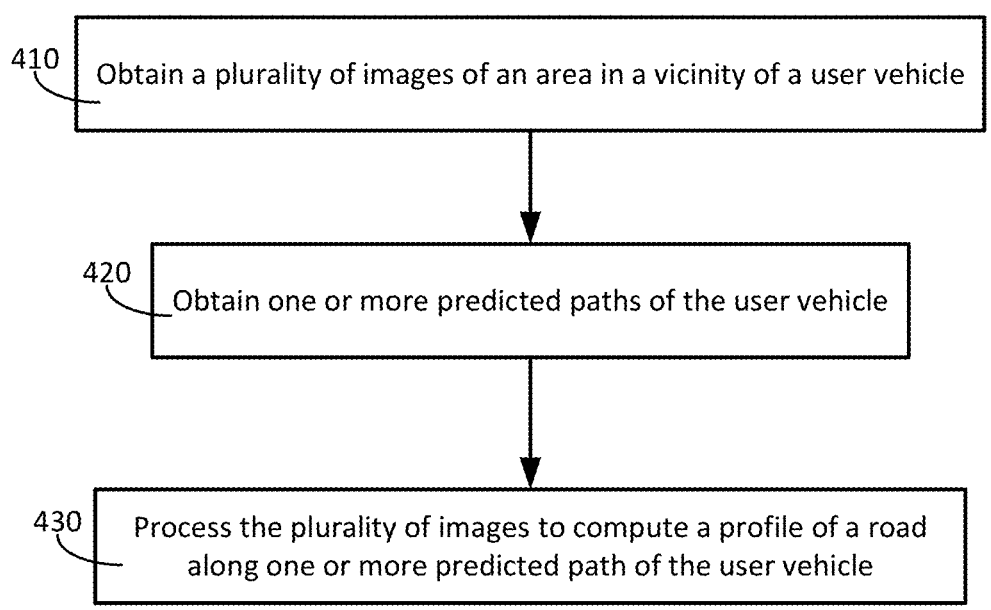
FIG. 4 is a flowchart illustration of a method of providing a road profile along a predicted path of a vehicle, according to examples of the presently disclosed subject matter.

Reference is now made to FIG. 4, which is a flowchart illustration of a method of providing a road profile along a predicted path of a vehicle, according to examples of the disclosed embodiments. It would be appreciated that the method illustrated in FIG. 4, and described herein with reference thereto can be implemented on the system 100 shown in FIG. 1, and can be part of the system shown in FIG. 2F. However, it should also be noted, that the method illustrated in FIG. 4, and described herein with reference thereto, can be implemented on any other suitable hardware and can be implemented as part of any suitable system, in particular as part of any suitable vehicular system that is configured to use input related to a road profile.

Returning now to FIG. 4, in block 410, a plurality of images of an area in a vicinity of a user vehicle may be obtained. Optionally, the images can be obtained from one or more image capture devices (e.g., cameras), such as image capture device 122, image capture device 124, and image capture device 126, mounted on or in the user vehicle.

One or more predicted paths of the user vehicle can also be obtained (block 420). The predicted paths may be provided as input or can be estimated, for example, by software running on computer hardware, such as on the system 100 shown in FIG. 1. In other examples the predicted path is estimated, at least in part, on a remote and is communicated to the vehicle as input possibly with some additional processing taking place in system 100 onboard the vehicle.

A predicted path of the user vehicle may be determined in various ways. In one example, the predicted path may be determined by reading a current heading of the vehicle and predicting that the vehicle will maintain the same heading or predicting the future path of the vehicle based on its current heading, and optionally also based on its heading in the past (e.g., the vehicle heading trend over a duration of a few seconds or in previous drives along the same path). The heading of the vehicle can be obtained, for example, from kinematic sensors onboard the vehicle, such as steering angle sensors, gyroscopes, yaw sensors, etc. In determining the predicted path an instantaneous heading and/or a heading trend over a duration, of say a few seconds, can be obtained and used.

The current heading of the vehicle can be obtained from the steering system of the vehicle, for example. In an electronic steering system, the current heading can be obtained directly from the controller of the electronic steering system. In other types of steering systems, a sensor may be used to obtain a current state of the steering system or one of its components, and the current heading can be determined from the sensor's output. In yet further examples, the heading of the vehicle can be obtained from gyroscopes or gyrostabilizers onboard the vehicle, that are capable of providing at least a yaw angle and/or a yaw rate of the vehicle. It would be appreciated that other sensors which are capable of providing a yaw angle of the vehicle can be used, possibly in combination with other data, to determine a predicted path of the vehicle.

In another example, the path of the vehicle can be predicted from images of an environment of the vehicle.

Optionally, images of the road ahead of the vehicle can be processed, and lane markings appearing in the images and/or road edges, such as curbs, can be detected in the images. Various models can be used in processing the images for estimating a predicted path of the vehicle. For example, image based lane detection methods, such as the ones used, for example, by Lane Departure Warning (LDW) systems can be used. Optionally, if lane marks are detected in the images it may be predicted that the user vehicle will keep on traveling within the lane, at the same distances from the lane marks. In a further example, the path prediction method may be configured to predict a small shift back to the center of the lane or some other typical position for a particular user or for a particular vehicle or for a particular combination of user and/or vehicle. The prediction algorithm can also be configured to support cutting of curves, such that the predicted path is shifted from the center of the lane, by a certain extent or at a certain rate, on (at least some) curves. The maneuver computed by the path prediction algorithm and which is represented by the predicted path, can be predefined, can take into account the layout of the curve, its curvature, the elevation map of the curve, user behavior and preferences, presence of other vehicles on the curve, the specific lane on which the vehicle is predicted to be when entering the curve (in case there is more than one lane), characteristics of the vehicle, its maintenance condition, user/driver policy and settings, the weather, time of day, etc.

Optionally, images captured by the image acquisition devices onboard the user vehicle can also be processed to determine lane merges or splits, highway exists, and other path related image features and such image features can also be taken into account when determine a predicted path of the vehicle. Based on the lane markings and/or road edges detected in the images, a predicted path of the vehicle can be determined. Optionally, when predicting the path of the vehicle based on lane marking and/or road edges which are detected in images of the road ahead of the vehicle, a position of the vehicle can also be determined. Thus, for example, in a multi-lane road, if the vehicle is currently traveling within a certain lane, the prediction may assume that the vehicle will stay within the same lane. In other examples, the prediction can also estimate which lane the vehicle will be on in the future, and this may not necessarily be the same lane as the one currently the vehicle is currently on, for example, when there is a lane merge ahead, or when the lane that the vehicle is currently on is congested. Examples of methods of detecting lane marks, road, edges, and lane merges in images, and of predicting a path of vehicle based on lane marks detected in images and based on and other image data are disclosed, for example, in the following commonly assigned patent applications, publications and issued patents: U.S. Provisional Patent Application No. 62/270,431, PCT Application No. PCT/US16/17411, U.S. Pat. Nos. 9,233,688, 9,205,835, U.S. patent application Ser. No. 14/828,112, US Patent Application Publication No. 2014/0160244, each of which is hereby incorporated by reference in its entirety. Mobileye Vision Technologies Ltd. of Jerusalem, Israel markets products that implement these and other object detection algorithms, including vehicles, pedestrians, animals, etc. by processing images captured by a camera mounted onboard a vehicle.

According to examples of the presently disclosed subject matter, another method which can be used to predict a path of the user vehicle which can is based on machine learning. Optionally, a neural network can be trained, over a large set of images, to predict, from an image of an environment of a user vehicle, the path that the user vehicle will take. Optionally, the machine learning learns from the images the actual path taken by the vehicle/driver determined by looking ahead in the image sequence to see where the vehicle actually traveled. A neural network can be thus trained to learn the correct path taken by the vehicle/driver, where the cost function for training can be, for example, the distance between the predicted path and the actual path. The distance can be measured as pixels in the image or lateral distance on the road. An example of a machine learning based path prediction method is disclosed in the commonly assigned U.S. Provisional Patent Application No. 62/181,784, which is hereby incorporated by reference in its entirety.

The machine learning method can be used to predict the path for user controlled vehicles, for autonomous vehicles or for both. The machine learning based path prediction method can be combined with any of other path prediction methods. For example the machine learning based path prediction can have different neural networks for different types of users/drivers. Thus for example, for some users the neural network can be trained to predict more aggressive lines through curves. In still a further example, the machine learning based path prediction can have different neural networks for different types of vehicles, such that trucks and private cars are trained, at least to some extent, with different paths through similar paths.

According to a further example of the presently disclosed subject matter, the path prediction algorithm can also take into account a presence of an object on the road. Still further by way of example, in case an obstacle (e.g., a speed bump or a pothole) is detected on the road, the path prediction algorithm may be configured to estimate the lateral extent of the obstacle. According to one example, an obstacle detection process which can be implemented by the system can include processing the images acquired by the image capture device onboard the vehicle can to detect a dark (or bright) patch associated with the obstacle, and the lateral extent of the path in the image can be estimated. At night protruding obstacles, such as speed bumps for example, may be detected in the image by a brighter horizontal patch on the near side of the bump due to illumination of the car headlight on a surface which is more upright, and by a darker patch on the far side of the bump dues to the lack of illumination by the host car headlights which are lower than the camera. The lateral extent of these light and dark patches gives the lateral extent of the bump and suggest an alternative path. A similar method can be devised for other types of obstacles including recessed obstacles, such as potholes.

The detected obstacle (or a portion of the obstacle) can possibly be projected to the real world to determine its real-world measurements. Optionally, if the lateral extent is not large, say less than a predefined threshold, the path prediction algorithm can be configured to predict a path for the user vehicle that bypasses the obstacle to the left or right. Thus, for example, if a speed bump is detected ahead of the vehicle, and it is determined that the speed bump does not cover the full width of the lane it might be reasonable to predict that the driver will aim for a path that will bypass the speed-bump. If a speed bump (or any other obstacle) is detected in the images, a search can be made in the image from the high point on the bump (or the low point in case of a pothole, or the extremity, in general) laterally to estimate an end to the bump along the row. Another option if a bump (or obstacle) is detected, would be to test whether a bump exists along a path close to the edge of the lane, and in particular close to a road boundary, such as a sidewalk. If no bump exists at the edge of the lane it might be reasonable to predict a path where one wheel stays on the level road, avoiding the speedbump (or obstacle).

For example, a (relatively) computationally efficient alternative path search can involve: detecting a deviation from smoothness (can be defined in various way as discussed herein) along a current (predicted) path. If excessive deviation from smoothness is detected at a certain distance the alternative smooth regions can be searched for at that distance. If such a "smoother" region is detected, an alternative path, starting from the current path, passing through the smoother alternative area, and retuning to the current path can be constructed, and may be used as a replacement or an additional predicted path. Optionally, it can also be estimated whether a lateral deviation from the path would cause less (or more) discomfort than passing over the obstacle. Optionally, the alternative path can then be analyzed for safety and nearby vehicles and obstacles. Lane type information can also be used to ensure that the alternative path does not cross a solid white line or get too close to a curb. Optionally, the alternative path analysis or one or more steps of the process can be partitioned between the road profile computation system and the steering control system. If the alternative path is determined to be better than the previous predicted path it can be provided as output to the steering controller. Optionally, since computing a profile can be computationally expensive the system can be configured to first evaluate whether the alternative path is acceptable and/or desirable based on less computationally intensive processes, such as processes which are used to determine effects, availability, bounds or ability of lateral motion, safety of certain maneuvers or a more abstract safety envelope, etc.

In some cases an obstacle in or on the road surface has no telltale indication in the image texture. For example, badly laid road or frost heaves can produce such smooth bumps. By way of example, in this or in other cases where the system is configured to do so, an efficient search for alternative paths can be performed. By way of example, according to such a search method, once a bump is detected along the predicted path an alternative path of the maximal allowable lateral deviation can be explored. If this alternative path turns out to be smooth a third path can be explored in between the first and second paths. If this third path is significantly smoother (the determination of smoothness is discussed elsewhere in this disclosure), say than the original, a fourth path can be explored between the 3rd and first paths. This form of bisection can be performed until no better improvement in smoothness or lateral deviation is expected, at which point the alternative is selected as the new predicted path. Given the finite width of the vehicle's tire there is a limit to the effect of minor changes in the path. The extent of potholes can similarly be detected and alternative paths can be evaluated and used to control the vehicle's path to avoid the wheel going into the pothole.

Optionally, driver/user habits or driver/user policy can be used, possibly in combination with other path prediction methods, to predict which path a user will choose for the vehicle. If, based on past behavior of the user often tries to bypass the bump, then this behavior can be detected, recorded and then used when predicting a path for the user vehicle.

Another indicator that can be used to determine a predicted path is yaw rate. In particular yaw rate extracted from images, such as the images acquired by the image acquisition unit onboard the user vehicle. In general, yaw rate can be noisy but if it is determined that there is a bypass path and the yaw rate indicates a turn towards the bypass then it raises the probability that the bypass will be taken. If the required steering to perform the bypass is not large and the path is clear from road edge or other vehicles the likelihood that the bypass will be taken is also greater. Thus, for example, multiple factors can be combined together and can be used to determine a predicted path or to select from two or more possible predicted paths: required turn for new path, safety of new path, yaw towards new path and driving habits. The yaw rate can also be used to determine and record the driver policy, mentioned above, although any other suitable method can be used for determining the driver policy.

Optionally, when a path is predicted in response to a detected obstacle ahead of the vehicle, the predicted path can be computed based on, possibly among other factors, traffic conditions. In this regard, it would be appreciated that the driver will be less likely to swerve to avoid a pothole if there is a vehicle in the adjacent lane. As mentioned above, surrounding traffic and other safety conditions can be taken into account in combination of as part of path prediction processes that are based on other methods.

According to another example of the presently disclosed subject matter, the path of the user vehicle can be determined from a trajectory or a path, either a prestored trajectory or path, or one that is calculated, for example, based on a prestored layout or trajectory of the road or of individual lanes along a certain road. The path can take into account one or more of the following: a current location of the vehicle, a segment of road on which the vehicle is located, a lane in which the vehicle is positioned, a starting point of the vehicle, a destination of the vehicle, and a suggested route of the vehicle (e.g., out of various possible routes from a given source point to a given destination point, the route which the user vehicle is predicted to take).

It would be appreciated, that a known route (out of various possible routes from a given source point to a given destination point, the route which the user vehicle is predicted to take), may not be of sufficient resolution for use in determining an effective road profile estimate for a user vehicle. One reason is that many obstacles on the road do not extend across the entire route, and at a given point along a route, a driver or a control unit of an autonomous vehicle can select different paths, and along such different path the road profile can vary. Thus, for active or adaptive suspension systems a more refined, higher resolution path prediction may be required. One possible path prediction method which can be used is the crowdsourced based trajectory estimate method as suggested for example, in the commonly assigned PCT Application No. PCT/US16/17411. This method is based on a sparse map, to support low-bandwidth updates. However, it would be appreciated that other methods, including methods that use HD-Maps and other forms of pre-stored paths can be used.

In accordance with another example, the path prediction can be performed taking into account user specific input, or input that is specific to the type of vehicle or even the specific vehicle for which the path is being predicted, the user (e.g., a human driver or human operator/passenger in case of an autonomous vehicle) riding the vehicle for which the path is being predicted. The user/vehicle specific path prediction input can relate to the driving behavior or policy of the user or vehicle. For example, some users can be more prone to "cutting" corners, which means they follow a more "aggressive" lines through turns keeping to the outside edge of a lane when initiating the turn, gradually approaching the inside edge of the lane and the apex of the turn, and the gradually approaching the outside edge of the lane again at the turn exit. In another example, some types of vehicles can be associated with "sweeping" sharp turns, such as buses and trucks maneuvering sharp turns, such as can be often found in urban environments. Such inputs relating to driver policy, user (past) behavior, vehicle type, maneuver capabilities and characteristics of the driver or of the vehicle can be provided as input to a path prediction algorithm and can be taken into account when computing the estimated path of the user vehicle.

Another form of input data that can be used in determining a predicted path is user input. For example, a plurality of paths can be presented to the user and the user can select a preferred path. The selection operation can be carried out through any available user interface, including for example, a touch (on a tactile screen), a voice command (through a voice recognition/command), by a hand gesture (using a camera and image processing software), etc. In another example, the eye movement of the user can be tracked (using a camera) and the path prediction algorithm can analyze the user's direction of (gaze) focus to estimate a predicted path, possibly with some of the other path prediction method mentioned herein.

According to examples of the presently disclosed subject matter, more than one (e.g., two, three, . . . , n) paths can be predicted and a plurality of such predicted paths can be obtained. As will be described below, the system computes a road profile along a predicted path, and optionally, the system can compute a plurality of road profiles for a respective plurality of predicted paths, where at least one of the road profiles is computed based on image data. The system can provide the plurality of road profiles as output, and let the controller, say an active suspension controller, decide which one of the plurality of predicted paths is closest to the most up to date path estimate, and use the respective road profile. It would be appreciated that predicting a plurality of paths, and computing a plurality of road profiles may be more computationally economical than computing a full road surface profile, and leaving it to the suspension controller to figure out the relevant portion of the road.

According to examples of the presently disclosed subject matter, a plurality of path prediction methods can be used and evaluated over time, and the best one (or two, three, . . . , or n methods) can be used for predicting the vehicle's path, and along which predicted paths the road profile can be computed, as described above. Still further by way of example, one method that can be used to evaluate the quality or accuracy of a path prediction method can involve comparing the predicted path resulting from a respective method with the actual path recorded for the vehicle and measuring a lateral distance between the two paths at a certain distance or at a certain headway, for example, in seconds, or computing the mean lateral distance or the number of frames where the lateral distance was greater than a certain threshold such as one tire width. In another example, such a measure can be computed only for sequences where there are road bumps or other places where the suspension controller actually needed to take action.

According to examples of the presently disclosed subject matter, one or more preferred path prediction methods can be selected, and the use of one or more prediction methods can be suspended or discontinued. For example, if it is determined that a certain method seldom matches the path that is actually used by the user vehicle, or is too far apart (based on some measure) from the path that is actually used by the user, that method can be suspended from further use in the future, or it can be used less often. Still further by way of example, one or more prediction methods which have been suspended or discontinued may be re-evaluated from time-to-time. Still further by way of example, it is possible that one path prediction method will be selected and only such single path prediction method shall be used, e.g., for a particular vehicle, user, area, type of curves, etc., or combinations thereof.

The predicted path can take on any form and can be provided in any suitable reference frame. For example, the predicted path can be provided as a spline in an arbitrary coordinate frame, such as disclosed in the commonly assigned PCT Application No. PCT/US16/17411. In another example, a predicted path can be denoted by a plot of 2D or 3D points in a global reference frame. In case a plot of 3D points is used to denote the predicted path, the z coordinates (elevation) may not have a sufficient density (e.g., the sample points may be too far apart) or the z coordinates may not have a sufficient resolution, or the quality of the data may not be sufficient (e.g., too noisy, or not accurate enough), so that the estimated road profile along the predicted path can be used to provide better density and/or resolution and/or quality. The higher density and/or resolution and/or quality may be a requirement of, say, an active or adaptive suspension system. The predicted path can also be provided with an indication of a width of an obstacle along the predicted path, or on (either) side of it. In another example, the image based road profile can simply provide redundancy and backup in case the predicted path also includes elevation data.

Reference is now made to FIGS. 5A-5E show an image of a road ahead of a user vehicle and two predicted paths overlaid thereon, according to examples of the presently disclosed subject matter. Lines 502A-502E and 504A-504E denote a right and left wheel tracks, respectively, of a predicated path that is based on steering wheel angle. Lines 506A-506E denote a (single) predicted path that is based on machine learning, for example, based on the method disclosed in U.S. Provisional Patent Application No. 62/181, 784. It would be appreciated that the predicted path 506A-506E can be converted to provide a predicated path along the vehicle's wheel tracks, in a similar manner to the steering angle based predicted path denoted by lines 502A-502E and 504A-504E, based on a known relative position of the camera onboard the user vehicle and the vehicle's wheels.

Figure 5A:
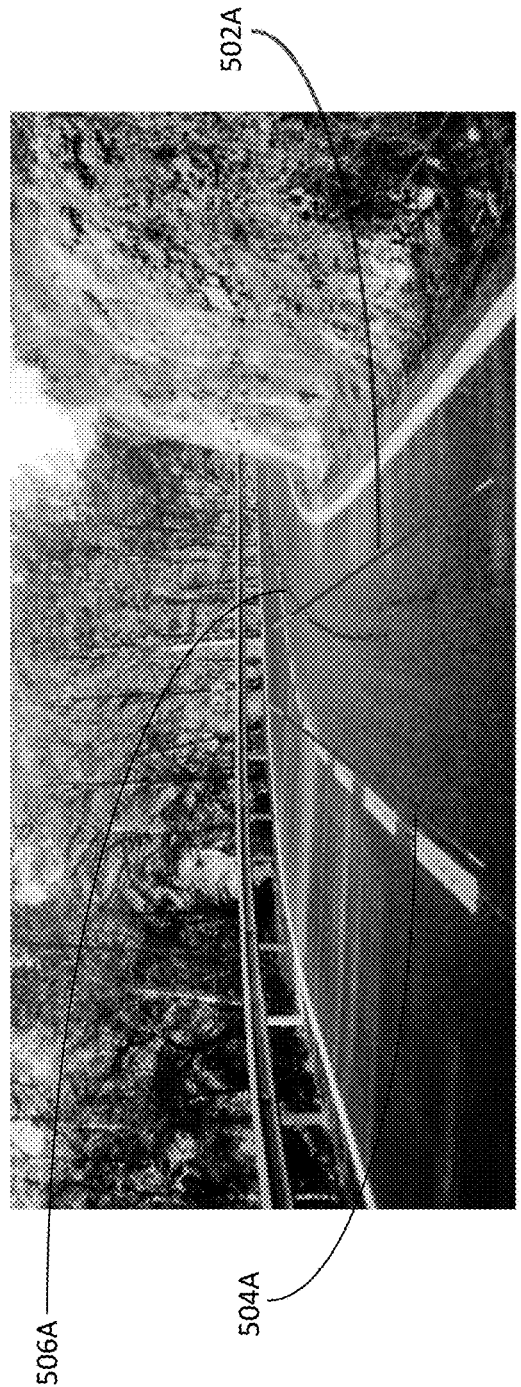
FIGS. 5A-5E are a sequence of images of a road ahead of a user vehicle and two predicted paths overlaid thereon, according to examples of the presently disclosed subject matter.
Figure 5B:
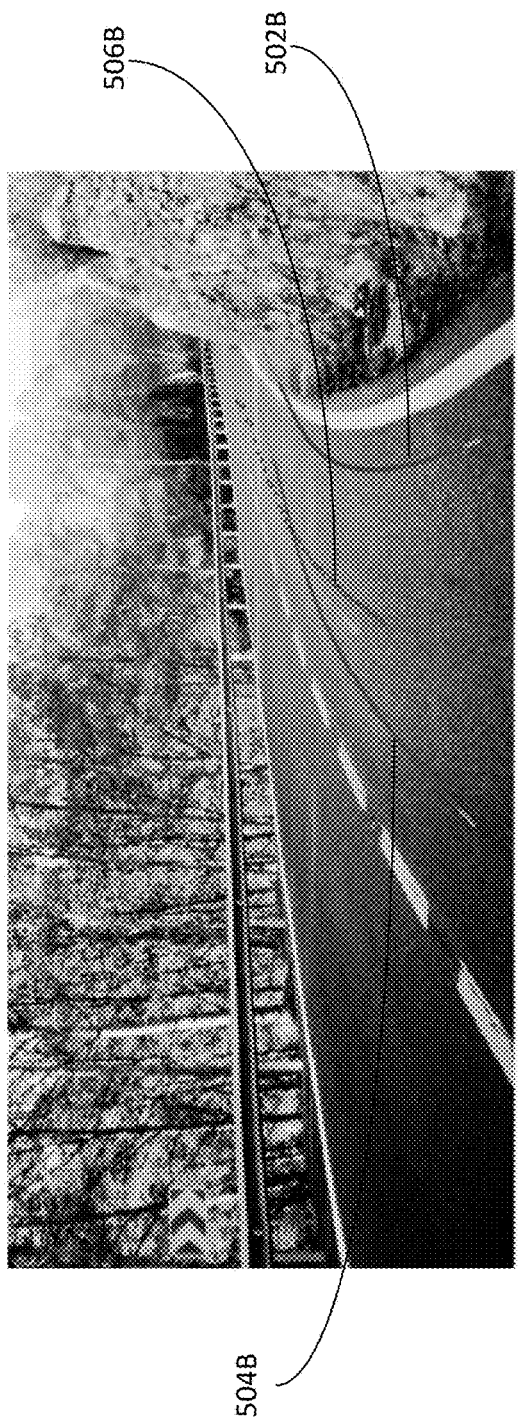
Figure 5C:
Figure 5D:
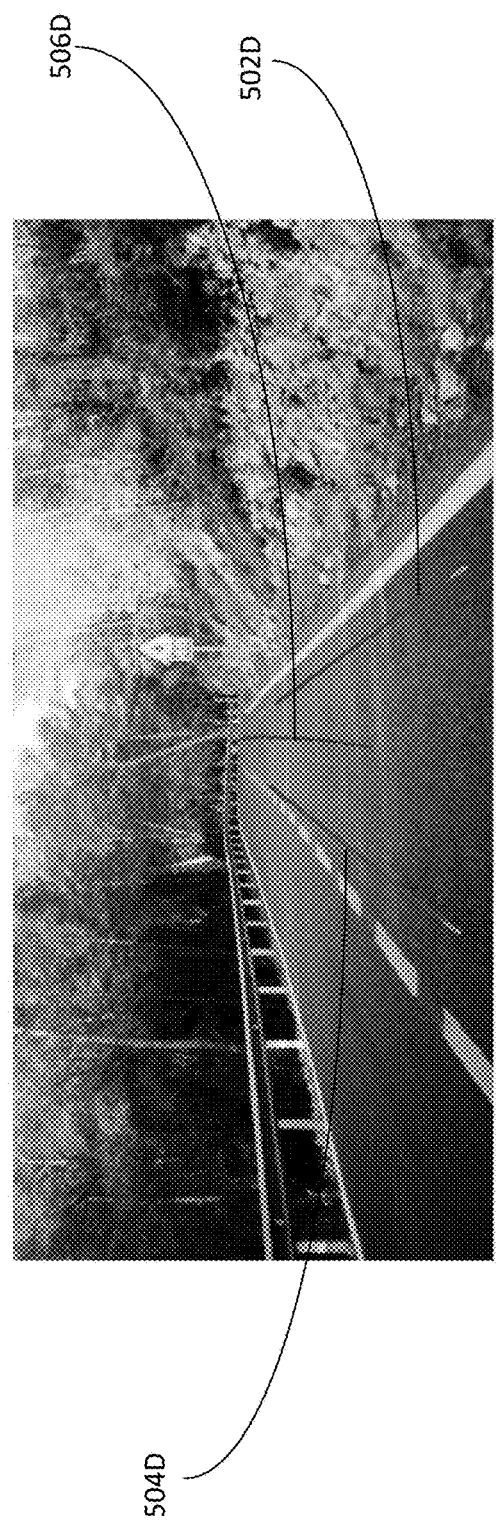
Figure 5E:
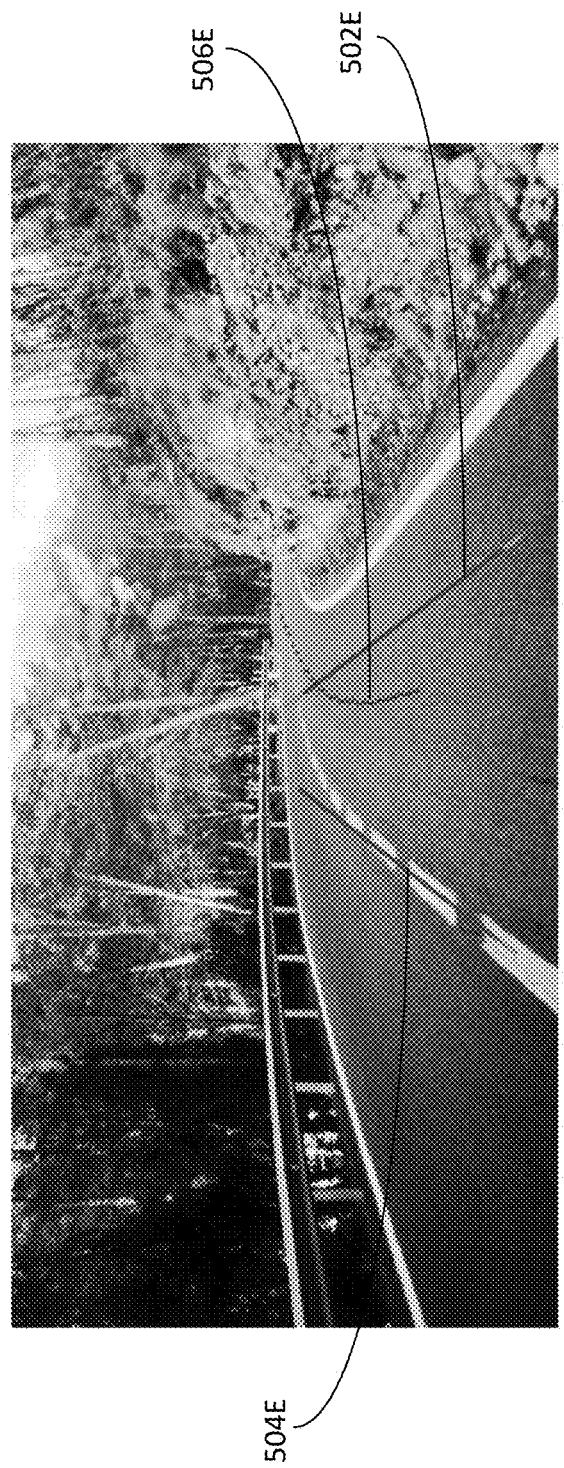

As can be seen in FIGS. 5A-5E, at least in this scenario, the steering wheel angle based path prediction, denoted by lines 502A-502E and 504A-504E, is correct on straight lines (see for example FIG. 5D) and inside the curve (see for example FIG. 5B), but at the beginning and end of curves the steering wheel angle based predicted path is incorrect (see for example FIGS. 5A and 5B). The machine learning based path prediction, denoted by lines 506A-506E, correctly predicts the curves ahead throughout the scene.

As will be described below, and with reference to one possible scenario for the example shown in FIGS. 5A-5E, the system according to examples of the presently disclosed subject matter can compute a road profile for one or both of the predicted paths using image data. For example, the system can be configured to process the images shown in FIGS. 5A-5E and compute a road profile along one or both of the predicted paths. In one example, the processor can determine, instantaneously or over a period of time, that the machine learning (in this example) based path prediction is more accurate, or the processor may determine that the machine learning (in this example) based path prediction is more consistently accurate enough, and the imaged based road profile can be carried out only along the path that was predicted using machine learning. As mentioned above, there can be various possible implementations for a process of selecting which path prediction method(s) to use as part of examples of the presently disclosed subject matter, and various variations based on additional inputs, environmental conditions, user behavior and preferences, characteristics of the road (such as type of curve, etc.), safety and other conditions of the vehicle's surroundings, etc.

Resuming now the description of FIG. 4, at block 430 the plurality of images of the area in the vicinity of the user's vehicle can be processed, a profile of a road along one or more of the predicted paths of the user vehicle can be estimated based on image data. According to examples of the presently disclosed subject matter, as part of estimating a profile of a road along a predicted path, possibly along each predicted path from a plurality of paths along which a road profile is estimated, a wheel track or wheel tracks along the path can be defined or estimated. The wheel track, can include one or more estimated wheel tracks of the user vehicle along the respective predicted path. Still further by way of example, the profile of the road along each one of the one or more predicted paths of the user vehicle can be limited to approximately the width of the track of each wheel or wheel-pair (or group of wheels for trucks and other such multi-wheeled vehicles) of the vehicle along the respective predicted path. The wheel track can be based on generic information or it can be based on information that is specific to the user vehicle, such as location of the wheels relative to the camera or any other sensor or reference point onboard the vehicle that is used to determine the position of the vehicle along the predicted path. Similarly, the width of the predicted path or of portions of the predicted path can also be associated with a measured, generic other estimated width of the user vehicle's wheels or tires. Thus for example, for a four-wheel car, the predicted path can include two wheel tracks at the location of each pair of the car's wheels, and the width of the path can be equal (or similar) to the width of the car's tires.

One example of a method that can be used for processing the plurality of images of the area in the vicinity of the user's vehicle to compute a profile of a road along a predicted path of the user vehicle is described in the commonly assigned U.S. Pat. No. 9,118,816, which is hereby incorporated by referenced in its entirety. U.S. Pat. No. 9,118,816 discloses a driver assistance system that is operable, while the host vehicle is moving, to detect a deviation in vertical contour of a road. A first image frame and a second image frame are captured in the field of view of the camera. Image motion is processed between respective images of the road derived from the first image frame and the second image frame. The vertical contour of the road is estimated using a road surface model, and the deviation in the vertical contour can be computed from the road surface model. Other road profile formats can also be used.

According to examples of the presently disclosed subject matter, one or more predicted paths can be projected onto the image(s) reference frame, and the road profile estimation can be carried out along the predicted path(s). If the predicted path is already given in the image reference frame, the projection of the predicted path on to the image reference frame can be avoided. The computation of the road profile can thus be limited to a predicted path or paths, reducing the computational load and other resource consumption, latency, etc.

In another example, the processor can be configured to implement a model based classifier to detect certain obstacles. For example, the processor can be preconfigured to process image data and detect image data which corresponds to Berliner Cushions on the road. Optionally, the processor can also use prestored specifications of certain obstacles, such that when such obstacles are detected, their dimensions and possibly further information such as their rigidity, etc., can be quickly and easily (without much computation load) determined. Optionally, the availability of bypass maneuvers or possibility of avoiding such known obstacles can also be predefined or prestored and can be relatively easily and efficiently be access by the processor for computing a road profile or for determining an (alternative) predicted path.

It would be appreciated that other image based methods can be used to determine a road profile along a predicted road, including monocular based image processing methods, other image flow analysis methods, and/or methods which are based on stereoscopic image processing, and particularly processing of images taken from two or more cameras, but also time of flight and active triangulation methods that use a projector to project a pattern onto a scene (including the road surface), and capture and process an image of the a reflected portion of the projected pattern.

In a two camera system a known relative translation and orientation of the two cameras together with an estimated or predicted road plane can be used to determine the homography between the two images. The residual motion after alignment using the homography can assist in determining the road profile.

It would be further appreciated that other methods can be used in combination with image based road profile estimation method(s), to estimate the profile of the road along a predicted path, including for example, methods that are based on Lidar systems, which can be used to scan a surface of the road to determine the road's profile, radar based system's etc.

Figure 6:
FIG. 6 is an example of an output road profile along a predicted path, in accordance with examples of the presently disclosed subject matter.

Reference is now made to FIG. 6, which is an example of an output road profile along a predicted path, in accordance with examples of the presently disclosed subject matter. On the left side, an image acquired by a camera attached to an inner surface of a front windshield of a user vehicle is shown, and on the image a predicted path with residual motion is shown. On the top right, there are shown current road profiles along each of a left and a right wheel track of the vehicle along a predicted path from 5 m to 20 m ahead of the vehicle. The predicted path is sampled every 5 cm from 5 m to 10 m, and every 10 cm from 10 m to 20 m. On the bottom right, there is shown a 1D sample for each of a left and right wheel tracks of a predicted path showing the accumulated profile from 7 m ahead of the vehicle to the vehicle itself (or some point of reference on the vehicle). In this example, the predicated path is straight ahead, and just the one predicted path is shown. However, it would be noted, and shown below, that other scenarios occur and are handled the method and system according to the present disclosure. It would be appreciated that the parameters presented in FIG. 6, are provided by way of example only, and that other parameters or other densities, resolution, etc. can be used in examples of the presently disclosed subject matter.

It would be appreciated that due to latency of the communication and computation into, inside and from the camera unit, a predicted path can be determined based on old information, and in the case of maneuvers might be incorrect. If the predicted path does match the actual path then it is possible that the suspension system will respond to road bumps, pot holes, and other obstacles on the road that the wheels will not actually encounter. This is of particular importance with active suspension which lift and lower the wheels. The suspension controller can be configured to compare the path used for computing the profile with the most current path estimation available. In addition, according to the examples of the presently disclosed subject matter, the predicted path and the road profile that is computed based on the predicted path can be continuously updated, providing the suspension controller with updates. If, however, there is not enough overlap between the predicted path and the actual path, or if it is otherwise determined that the road profile that is computed by the system according to examples of the presently disclosed subject matter, does not match the actual current road profile which the suspension controller is required to react to, then the suspension controller can ignore the road profile information and work as a purely reactive system. It would be appreciated that examples of the presently disclosed subject matter suggest possible path prediction methods that can achieve better accuracy of prediction relative to the (simplistic) methods that are based solely or mostly on the actual path traveled by the vehicle, e.g., using steering angle, or yaw sensors.

The format of the road profile output can be provided in any form suitable format, for example, it can be in a format that is compatible with a suspension control unit onboard the vehicle. In one example, the road profile output can be provided as an elevation map. In another example, the road profile output can be provided as two streams of elevation maps, one per each wheel track of the vehicle. The road profile data can be provided for a given distance ahead of the vehicle. The distance to which the road profile data can be fixed or can vary. In case the distance to which the road profile relates is variable, the road profile output can also include a spatial or temporal reference, which would indicate to a suspension control system to determine which is the appropriate time to use or act upon the road profile data received from the system. In yet another example, the system can be configured to re-evaluate the accuracy and/or the relevance of the road profile output which it previously provided and can issue updates or indications that the old data was not accurate or correct. In such cases, the suspension controller may be configured to rely on the more recent data or can choose which data to rely on. In another example, the road profile data can relate to a certain range ahead of the vehicle, and can be continuously updated with new data which overlaps at least to some extent some of the old (recent) data.

According to examples of the presently disclosed subject matter, the road profile output format can include an indicator as to the width of an obstacle detected on or near a predicted path with which the road profile is associated. For example the road profile output can include an indication that a pothole along the predicted path, with which the profile is associated, extends 0.75 m to the left and 0.5 m to the right of the predicted path. Having this indication can allow a controller which receives the road profile output to determine that when (or so long as) the actual path is within those margins the road profile information should be used to control the suspension and/or other systems or components of the vehicle, which may be affected by this particular road profile. Likewise, if the actual path is outside the margins, the specification of the obstacle which was provided with the road profile output can enable the controller to ignore it, and, for example, switch the vehicle's suspension to reactive mode.

Still further by way of example, the road profile along a predicted path can be provided in a stabilized coordinate frame. The profile can then be output as a profile on a frame by frame basis as with the previous version or the profile can be sampled to produce the road height at a particular point in front of the wheel (possibly for each wheel or wheel pair)

at a high sample rate. This latter format may require a lower rate of CAN messages (e.g. 10 samples per frame rather than 200 samples in other implementation) and may require less processing on the receiving side (e.g., the suspension system controller).

According to a further aspect of the presently disclosed subject matter, there is provided a control system for an advanced driver assistance system (ADAS) that includes an active steering function. Optionally the ADAS system is an autonomous vehicle (or a control system for an autonomous vehicle. In another example, the ADAS system includes a lane keep assist function (LKA). According to examples of the presently disclosed subject matter, the control system for an autonomous vehicle in accordance with examples of the presently disclosed subject matter, can include an image capture device, a data interface and at least one processing device, configured to receive images captured by the image capture device through the data interface. The processing device can be configured to obtain a path of the vehicle, and the processing device can be configured to compute a road profile along the predicted path. The path of the vehicle can be determine, at least in part, based on image data. It would be appreciated that a system which includes an active steering function, such as an AV system or an LKA system or function, can have a path determining/fetching function as an integral path thereof.

Optionally, the processor can be configured to estimate a smoothness of a first path, and the processor can search for a second path that is smoother than the first path. The smoothness can be evaluated in various ways. For example, the average elevation modulation can be taken into account. In another example shifts in elevation that are larger than a certain extent can be more severely regard (e.g., can be associated with high negative scores), certain uneven patterns can have a higher impact on the smoothness evaluation/score, etc. Optionally, the processor can be configured to compute a smoothness score for a path which is provided by the autonomous vehicle system (say, by the steering control system), where the score can be computed based on one or more factors, such as the ones mentioned above, and possibly others, and when the score is not satisfactory (say, below a predefined threshold), the processor can trigger or carry out itself an alternative path prediction process, in an attempt to find an alternative smoother path. As mentioned above, there are various methods that can be used to predict a path for a user vehicle and any such suitable method can be used. If the second (or third, or fourth, etc.) path is selected, the steering control system, and possibly the suspension control system and any other relevant system of the autonomous vehicle can receive as output the selected path and possibly also the road profile along the selected path.

It would be appreciated that the path prediction and the road profile computation, in particular along a certain path, can be carried out according to the examples described above. Optionally, the alternative path prediction process can be controlled so that the alternative path is distant from the rejected path(s) by at least a certain margin. An example of such a margin can be a wheel width or the user vehicle. In another example, the margin can be based on an analysis of the lateral extent of an obstacle on the road, as was described above. In another example, the road and/or lane boundary can constrain the alternative path search. In yet another example, the search for an alternative path can simply involve a search for the closest path that is smooth enough (using any of the criteria mentioned here or any other suitable criterion), and leave it to the steering controller to determine if such a path deviation may be considered.

Similar considerations may be used to steer around a pothole or to ensure that the pot hole passes underneath the center of the vehicle.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system, comprising:
   at least one processing device configured to:
   receive a plurality of images of an area in a vicinity of a host vehicle captured by an image capture device;
   determine a first predicted path of the host vehicle based on analysis of the plurality of images;
   determine a second predicted path of the host vehicle based on a heading of the host vehicle;
   compute a first vertical contour of a road along the first predicted path and a second vertical contour of the road along the second predicted path; and
   output the first vertical contour and the and second vertical contour to enable controlling a component of the host vehicle based on at least one of the first vertical contour and the second vertical contour.

2. The system according to claim 1, wherein the component of the host vehicle is an adaptive suspension system.

3. The system according to claim 1, wherein the component of the host vehicle is a braking system.

4. The system according to claim 1, wherein the component of the host vehicle is a steering system.

5. The system according to claim 1, wherein the first vertical contour comprises a pot hole.

6. The system according to claim 1, wherein the first vertical contour comprises a bump.

7. The system according to claim 1, wherein the first vertical contour includes multiple road conditions that are used to separately control suspension for different wheels.

8. The system according to claim 1, wherein the second vertical contour includes multiple road conditions that are used to separately control suspension for separate wheel tracks of the host vehicle.

9. A method, comprising:
  receiving a plurality of images of an area in a vicinity of a host vehicle captured by an image capture device;
  determining a first predicted path of the host vehicle based on analysis of the plurality of images;
  determining a second predicted path of the host vehicle based on a heading of the host vehicle;
  computing a first vertical contour of a road along the first predicted path and a second vertical contour of the road along the second predicted path; and
  outputting the first vertical contour and the and second vertical contour to enable controlling a component of the host vehicle based on at least one of the first vertical contour and the second vertical contour.

10. The method according to claim 9, wherein the component of the host vehicle is an adaptive suspension system.

11. The method according to claim 9, wherein the component of the host vehicle is a braking system.

12. The method according to claim 9, wherein the component of the host vehicle is a steering system.

13. The method according to claim 9, wherein the first vertical contour comprises a pot hole.

14. The method according to claim 9, wherein the first vertical contour comprises a bump.

15. The method according to claim 9, wherein the first vertical contour includes multiple road conditions that are used to separately control suspension for different wheels.

16. The method according to claim 9, wherein the second vertical contour includes multiple road conditions that are used to separately control suspension for separate wheel tracks of the host vehicle.

17. A non-transitory computer-readable medium, comprising:
  at least one processing device configured to execute instructions to:
    receive a plurality of images of an area in a vicinity of a host vehicle captured by an image capture device;
    determine a first predicted path of the host vehicle based on analysis of the plurality of images;
    determine a second predicted path of the host vehicle based on a heading of the host vehicle;
    compute a first vertical contour of a road along the first predicted path and a second vertical contour of the road along the second predicted path; and
    output the first vertical contour and the and second vertical contour to enable controlling a component of the host vehicle based on at least one of the first vertical contour and the second vertical contour.

18. The non-transitory computer-readable medium according to claim 17, wherein the component of the host vehicle is an adaptive suspension system.

19. The non-transitory computer-readable medium according to claim 17, wherein the component of the host vehicle is a braking system.

20. The non-transitory computer-readable medium according to claim 17, wherein the component of the host vehicle is a steering system.

* * * * *